US006966000B2

(12) United States Patent
Zhang et al.

(10) Patent No.: US 6,966,000 B2
(45) Date of Patent: Nov. 15, 2005

(54) METHOD AND SYSTEM TO REMOTELY GRANT LIMITED ACCESS TO SOFTWARE OPTIONS RESIDENT ON A DEVICE

(75) Inventors: Kun Zhang, Waukesha, WI (US);
Karamjeet Singh, Germantown, WI (US); William G. Blair, Waukesha, WI (US); Winnie C. Durbin, Dousman, WI (US); Michael R. Minogue, Milwaukee, WI (US)

(73) Assignee: GE Medical Technology Services, Inc., Pewaukee, WI (US)

( * ) Notice: Subject to any disclaimer, the term of this patent is extended or adjusted under 35 U.S.C. 154(b) by 758 days.

(21) Appl. No.: 09/681,480

(22) Filed: Apr. 13, 2001

(65) Prior Publication Data

US 2002/0152395 A1    Oct. 17, 2002

(51) Int. Cl.[7] .................................................. H04L 9/00
(52) U.S. Cl. ........................................ 713/200; 713/201
(58) Field of Search ............................. 713/168, 171, 713/178, 182, 185, 189, 200–202; 705/50–52, 705/56–59; 709/216–217, 219–221, 224; 711/100, 111

(56) References Cited

U.S. PATENT DOCUMENTS

| 4,672,533 | A | * | 6/1987 | Noble et al. ............... 340/5.74 |
| 5,179,702 | A | * | 1/1993 | Spix et al. ................... 718/102 |
| 5,388,211 | A | * | 2/1995 | Hornbuckle ................ 717/178 |
| 5,677,953 | A | * | 10/1997 | Dolphin ....................... 705/51 |
| 5,938,730 | A | * | 8/1999 | Tobita ......................... 709/224 |
| 6,301,666 | B1 |  | 10/2001 | Rive |
| 6,557,105 | B1 | * | 4/2003 | Tardo et al. ................ 713/193 |

* cited by examiner

Primary Examiner—Hosuk Song
(74) Attorney, Agent, or Firm—Ziolkowski Patent Solutions Group, SC; Michael A. Della Penna; Carl B. Horton

(57) ABSTRACT

A system and method are provided that remotely grants limited access and permits use of resident software options in accordance with terms consistent with an access grant. The invention includes receiving an access request from a user to access a software option resident in memory of a device, determining whether to grant access in response to the request, and generating an access grant in response to a qualified access request that is transmitted from a centralized facility to a remote device to automatically enable access to the option.

30 Claims, 2 Drawing Sheets

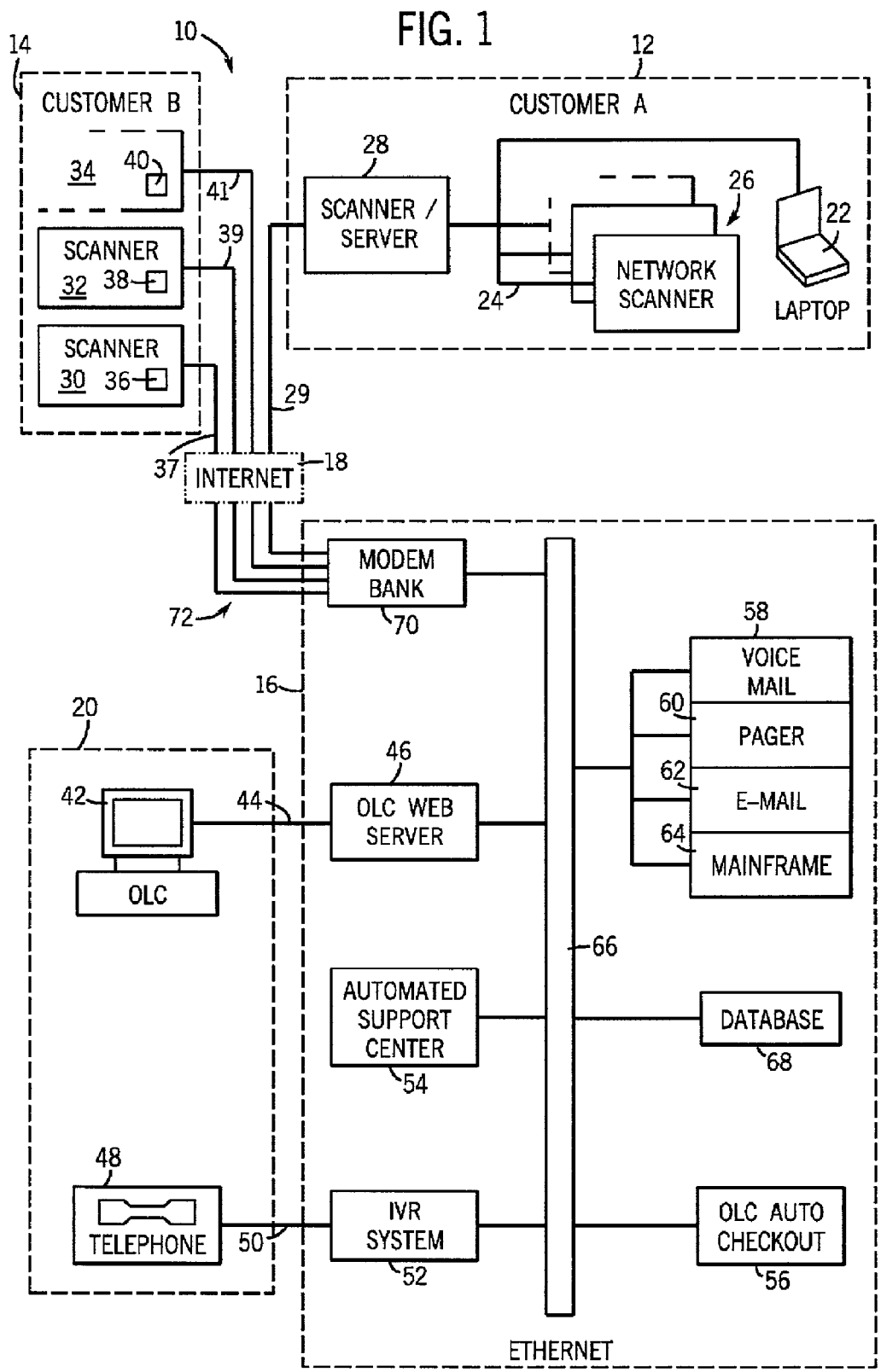

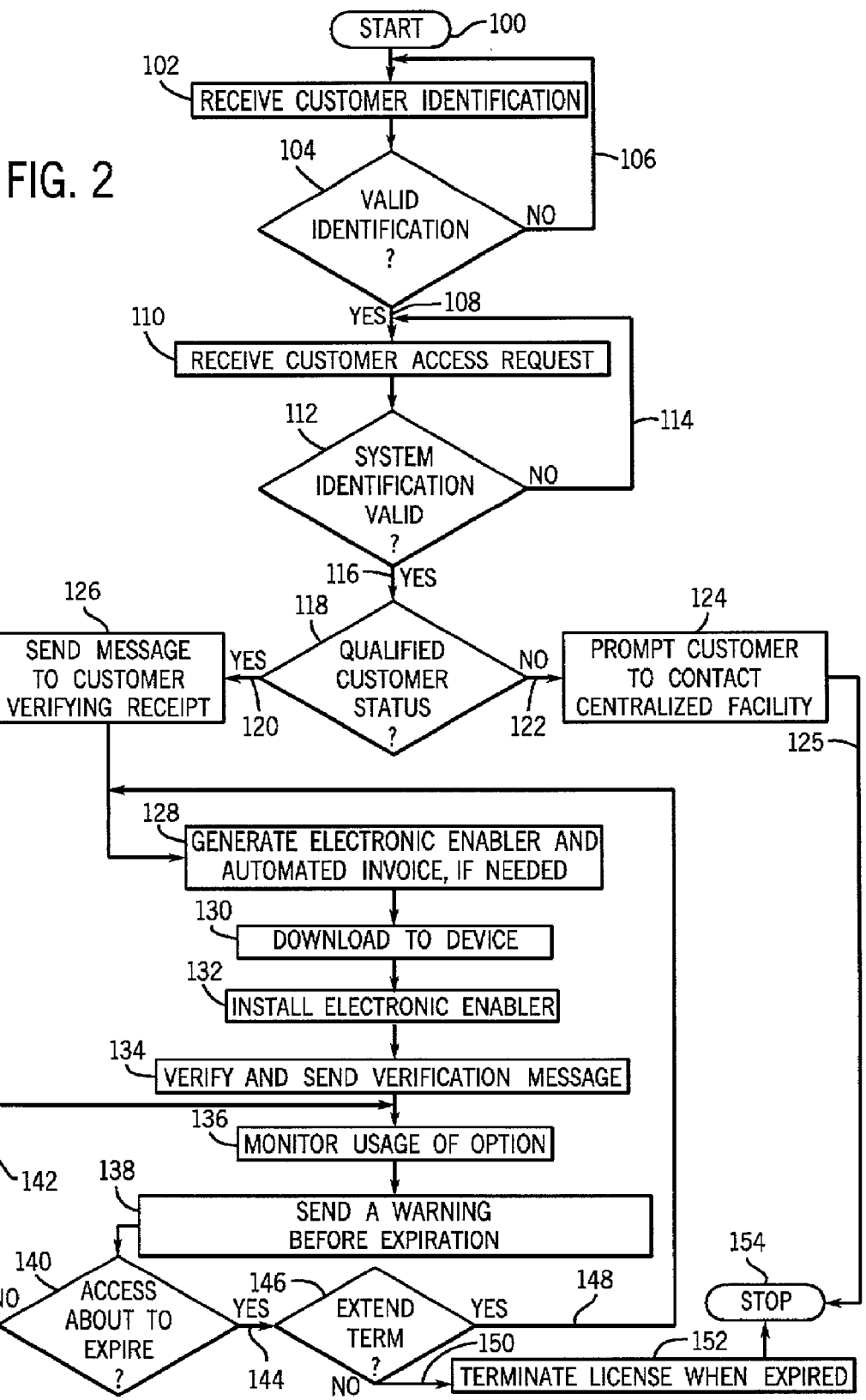

METHOD AND SYSTEM TO REMOTELY GRANT LIMITED ACCESS TO SOFTWARE OPTIONS RESIDENT ON A DEVICE

BACKGROUND OF INVENTION

The present invention relates generally to a system to enable software-based options, and more particularly, to remotely grant limited access to software options resident on a device.

Medical diagnostic devices and supporting systems, such as medical imaging systems, have become increasingly complex in recent years. Examples of such systems include magnetic resonance imaging (MRI) systems, computed tomography (CT) systems, ultrasound and x-ray systems, and positron emission tomography (PET) systems. These systems include many different software-based options, some of which are not used depending on customer needs and costs. To add to the complexity of each particular imaging system, many facilities today incorporate a variety of such devices all of which may not be configured identically. In larger facilities, the systems may be networked to permit common management and control. Further, such systems may be networked with a picture archiving and communication system (PACS) for storing digitized image data for subsequent retrieval and reconstruction. Additionally, teleradiology systems that involve transmitting digitized image data to remote locations for review and diagnosis by specialized physicians and/or radiologists may be used as well.

Because these medical diagnostic systems are used by different facilities with differing needs, not all of these systems operate identically. That is, although identical software may be installed at the factory, certain options are not desired or licensed by a customer or user, and therefore are not enabled when delivered. If a customer later wants to add these options to their devices, a license would need to be executed and service personnel with appropriate training would have to physically travel to the location where the devices are present to enable the software in order for the customer to gain access to a particular option.

Improvements in computer networks have greatly facilitated the task of offering assistance to remote facilities with medical imaging devices. In particular, rather than having to call a service center and speak with a technician or engineer, or await a return call from the service center, network technologies have facilitated proactive techniques wherein the service center may contact the medical diagnostic devices directly to check the status of the remote devices. Further advancements have been proposed to provide remote service to medical diagnostic systems in an effort to provide a level of service on a continual and interactive basis as needed by many facilities. In one such system, a service center can interactively receive messages via a network and can respond automatically to the messages if configured correctly. Data required to analyze the state of operation of the medical diagnostic devices can be transferred during an electronic connection. This technique greatly facilitates identification of system problems, allows questions to be posed to the subscribing service provider, facilitates transfer of updates and imaging protocols, and permits standard and customized reports to be transmitted to subscribing systems or stations. The interactive aspect of this technique allows the medical diagnostic facility to remain current on services provided by the centralized service facility and to readily communicate with the centralized service facility.

While such advancements in the provision of remote services to medical diagnostic devices have greatly enhanced the level of service and information exchange, they have not been used to remotely grant access and permit use of software options resident on such devices.

There is a need for a system where a qualified customer would have the ability to access a particular option already resident in memory of a device consistent with a customer's specific usage patterns. For example, in order to limit personnel costs and improve efficiency, many health care facilities schedule medical procedures, including medical imaging procedures, in a time block. However, health care facilities would traditionally purchase twenty-four hour access to an option and then only use the option for a portion of that twenty-four hours. As a result, the capabilities of a particular device are not optimally utilized.

It would therefore be desirable to permit access to optional, device capabilities on a pay-per-use or limited access basis, such that the device capabilities are available to a user on an as-needed basis. It would be further desirable to provide a warning of impending access expiration so that a renewing access request may be submitted and approved before expiration if desired, or if not requested, appropriate notice can be provided detailing that the option will no longer be available.

SUMMARY OF INVENTION

The present invention is directed to a system and method to remotely permit use of resident software options overcoming the aforementioned concerns.

The present invention includes a technique that includes hardware and software to identify a customer and, if desirable, license, permit access to, and enable options in remotely installed devices. Such a system includes a customer station that is distant from a centralized facility and has at least one software option that is controlled by a computer. A communications network connects the centralized facility to the customer station such that the centralized facility is capable of receiving and authenticating a customer identification, validating an access request, and creating an electronic enabler in response to the access request. The communications network relays data from the centralized facility to the customer station and includes a communications portion in the centralized facility and in the customer station. The communications network connects the centralized facility to the customer station through an external communications network, such as the Internet, direct dial-up links, or a wireless platform. Once an electronic enabler is generated by the centralized facility, the centralized facility transmits the electronic enabler through the communications network to the customer station to permit access to the option. In one embodiment, the electronic enabler is automatically downloaded, installed, and verified. Once operation of the option is verified, an electronic notification is transmitted to the customer providing notification that access is now available.

In accordance with an aspect of the present invention, a method to remotely permit use of resident software options is disclosed that includes receiving an access request from a customer or user of a remotely located device seeking access to an option resident in memory of the device. The method further includes determining whether to grant limited access in response to the access request according to whether a set of criteria have been met, and if the criteria are met, generating an electronic enabler or software key configured to permit access to the option in response to an access grant.

The method also includes transmitting the electronic enabler to the device, and automatically enabling customer access to the option in the device in response to reception of the electronic enabler.

In accordance with another aspect of the invention, an access granting system is disclosed comprising a device having at least one disabled option resident on a computer programmed to control the device and a centralized facility located remotely from the device and having at least one access computer. The access computer is programmed to receive from a qualified customer a request to access and use a disabled option and grant access and use, on a pay-per-use basis, of the disabled option for a predetermined time period.

The present invention further includes a computer data signal embodied in a carrier wave and representing a sequence of instructions which, when executed by at least one processor, causes the processor to receive at a centralized facility an access request from a user to access an option resident in a remote device. The sequence of instructions also causes the computer to determine whether the end user is qualified, and if so, grant limited access to the option resident in the remote device. A software key is generated by the computer to allow limited access to the option and sends the software key to the device, wherein the software key enables limited user access to the option.

Various other features, objects and advantages of the present invention will be made apparent from the following detailed description and the drawings.

BRIEF DESCRIPTION OF DRAWINGS

The drawings illustrate a preferred embodiment as presently contemplated for carrying out the invention.

In the drawings:

FIG. 1 is a block diagram of a system for which the present invention is implemented therein.

FIG. 2 is a flow chart showing a process of the present invention and implemented in the system of FIG. 1.

DETAILED DESCRIPTION

Referring to FIG. 1, an overview block diagram of a medical diagnostic and service networked system 10 is shown which includes a plurality of remote customer stations, such as Customer A referenced with numeral 12, and Customer B referenced with numeral 14. It is understood, that the number of customer stations can be limitless, but two specific embodiments are shown with Customer A and Customer B, which will be further explained hereinafter. The customer stations 12, 14 are connected to a centralized facility 16 through a communications link, such as a network of interconnected server nodes 18 or a remote link 20. Although a single centralized facility is shown and described, it is understood that the present invention contemplates the use of multiple centralized facilities, each capable of communication with each customer station. Each customer station has operational software associated therewith which can be configured, serviced, maintained, upgraded, monitored, enabled or disabled by the centralized facility 16.

The various systems disclosed are configured to be selectively linked to the centralized facility 16 by either the remote link 20, or in the example of customer station 12, a laptop computer 22 connected to an internal network 24 of Customer A. Such selective linking is desirable to provide upgrades, maintenance, service, and general monitoring of the various systems and equipment at a customer site, which includes accessing data from the systems and transmitting data to the systems, for example.

In general, a customer site may have a number of devices such as a variety of medical diagnostic systems of various modalities. As another example, in the present embodiment, the devices may include a number of networked medical image scanners 26 connected to an internal network 24 served by a single scanner 28 having a workstation configured to also act as a server, or configured as a stand-alone server without a medical image scanner associated therewith. Alternately, a customer station, or customer site 14 can include a number of non-networked medical image scanners 30, 32, and 34 each having a computer or work station associated therewith and having an internal modem 36, 38, and 40 to connect the remote customer station to a communications link, such as the Internet 18 through links 37, 39, and 41, respectively, to communicate with the centralized facility 16. Internet 18 is shown in phantom to indicate that an external communications network can include Internet 18, together with communication links 29, 37, 39, and 41, or alternatively, can include direct dial-up links through dedicated lines, an intranet, or public communications systems.

It is understood that each of the network scanners 26 has its own workstation for individual operation and are linked together by the internal network 24 so that the customer can have a centralized management system for each of the scanners. Further, such a system is provided with communications components allowing it to send and receive data over a communications link 29. Similarly, for the non-networked medical image scanners at remote customer station 14, each of the scanners 30, 32, and 34 have individual communications links 37, 39, and 41. Although FIG. 1 shows each of these links connected through an open network 18, these links can permit data to be transferred to and from the systems over a dedicated network as well.

The embodiment shown in FIG. 1 contemplates a medical facility having such systems as magnetic resonance imaging (MRI) systems, ultrasound systems, x-ray systems, computed tomography (CT) systems, as well as positron emission tomography (PET) systems, or any other type of medical imaging system, however, the present invention is not so limited. Such facilities may also provide services to centralized medical diagnostic management systems, picture archiving and communications systems (PACS), teleradiology systems, etc. Such systems can be either stationary and located in a fixed place and available by a known network address, or be mobile having various network addresses. In the embodiment shown in FIG. 1, each customer station 12, 14 can include any combination of the aforementioned systems, or a customer station may have all of a single type of system. A customer station can also include a single medical image scanner. Mobile diagnostic systems can be configured similarly to that of customer station 12 or customer station 14. Such mobile diagnostic systems can include equipment of various modalities, such as MRI, CT, ultrasound, or x-ray systems and are mobilized in order to service patients at various medical facilities.

A request for pay-per-use access and enablement of software-based options of the present invention can be initiated by authorized personnel, such as an on-line engineer or technician, or customer administrative personnel from a computer or workstation 42 in the remote link 20, which can be a part of the centralized facility 16, or be separately connected to the centralized facility 16 by a dialup link 44 to a web server 46 in the centralized facility 16. Alternatively, it is contemplated that the system could be initialized by a laptop computer 22 connected to a customer internal network 24, or individually connected to each of the scanners 30, 32, or 34. The remote link 20 can also serve to connect the centralized facility 16 to a customer station by a telephone and telephone connection 48 through a conventional telephone network 50 and to an interactive voice recognition system (IVR) 52 in the centralized facility 16. The centralized facility 16 includes a number of processing systems including computers for the IVR system 52, an automated support center 54, the web server 46, and an auto checkout server 56, for processing customer and product data and creating an appropriate configuration file. Other processor systems include computers to maintain a voice-mail system 58, a pager system 60, an email system 62, and a main frame 64, and more generally, an output report generator and notifier. Each is connectable and can transmit data through a network, such as an Ethernet 66 with one another, and/or with at least one database 68. However, it is understood that the single representation of a database in FIG. 1 is for demonstrative purposes only, and it is assumed that there is a need for multiple databases in such a system. It is also understood that the IVR system is not only a voice recognition system, but can also process interactive keypad entry from a touchtone telephone 48. A bank of modems 70 is connected to the Ethernet 66 to relay data from the centralized facility 16 to the remote customer stations 12, 14 through a plurality of modem links 72.

As previously discussed, each of the systems and substations described herein and referenced in FIG. 1 may be linked selectively to the centralized facility 16 via a network 18. According to the present invention, any acceptable network may be employed whether public, open, dedicated, private, or so forth. The communications links to the network may be of any acceptable type, including conventional telephone lines, fiber optics, cable modem links, digital subscriber lines, wireless data transfer systems, or the like. Each of the systems is provided with communications interface hardware and software of generally known design, permitting them to establish network links and exchange data with the centralized facility 16. The systems are provided with interactive software so as to configure the systems and exchange data between the customer stations and the centralized facility 16. In some cases, during periods when no data is exchanged between the customer stations and the centralized facility, the network connection can be terminated. In other cases, the network connection is maintained continuously.

The present invention includes a method and system for granting access to and remotely permitting use of resident software options in a device. As previously indicated, the device, including medical imaging equipment, includes installed software that controls options that are typically enabled or disabled manually by a field engineer on-site after processing of an access request from a qualified customer. The present invention is directed toward a method and system to remotely grant access to and enable these resident options for a pay-per-use period in accordance with terms provided in an access grant. The terms of the access grant may allow access to a resident option for any of a number of time periods and/or usage periods depending on a customer status that provides information on whether or not to grant access. If the customer status is qualified or favorable, then a customer may seek access to an option for a number of days, months, years, or a number of uses, i.e., 100 scans. Moreover, a customer may be granted access for certain days of the week or hours of the day. The terms of the access grant may be defined to accommodate a customer's usage pattern. The software options can be accessed by a qualified customer or any other authorized personnel with appropriate customer identification at the remote customer stations 12, 14 or from the remote link 20. It is understood that such access grant can include either an express or implied license to use the software and the software-based option.

From a centralized facility, and after appropriate authentication of the user and validation of the system identification and customer's status, an electronic enabler is generated in the centralized facility 16 and electronically transmitted to a device via the communication links 29, 37, 39, 41, and/or 72, preferably over a private communication link, but other public communications systems can work equally well, such as direct dial-up internet, or wireless communications. As previously set forth, it is understood that the external communications links include a closed intranet system, an open public communications system, or a combination thereof.

Referring to FIG. 2, once the method and/or computer program is initiated 100, customer identification is input electronically by a user or an authorized field engineer, at a remote customer station or a remote link, and received at the centralized facility 102. The centralized facility then validates the customer identification at 104. Validation is determined according to a customer identifier and a password. If the customer identification is not validated 106, the customer is prompted for a new, valid customer identification and password at 102. After a customer identification is validated 104, 108 the customer enters the particular software option requested and the centralized facility receives the customer request at 110, together with a system identification identifying the particular device that the customer wishes to access, such as any of the scanners 26–34. The centralized facility then validates the system identification at 112. If the system identification 12 is invalid 114, e.g., does not register the chosen device as capable of supporting the software-based option requested, for example, then the customer is prompted for a new license request at 110. If the system identification 112 is valid 116, then the customer's status is validated at 118.

Whether or not to grant limited access in response to the access request is achieved by determining if a set of criteria have been met, which determines the customer's status. A customer's status may be qualified or favorable if the centralized facility determines that the criteria have been met making it is desirable that the customer be approved and given access to the options, or unqualified or unfavorable if the criteria have not been met and denial of access is preferred. The set of criteria can be predefined in a variety of manners. For example, the criteria can require a current account balance or established line of credit. Alternatively, the set of criteria can comprise data such as a valid customer identification, a valid system identification, an option identifier, and a pay-per-use request identifier. In this manner, customer access to options can be limited to assure compliance with regulatory compliance, proper use of new and/or updated options as well as customer compliance with educational training programs and maintenance schedules. Furthermore, access may be denied for delinquent or past due account balances, unavailable credit, a poor credit history, or other accounting concerns. If the customer status is not qualified 122, the customer is prompted to contact a customer service representative at the centralized facility 124. After receiving the information for contacting the centralized facility, the customer then exits at 125 and the algorithm ends 154. The customer may then start the system anew at 100 once the qualification concerns are addressed.

Once the customer's status is qualified 118, 120, then the customer is notified at 126. Notification message 126 is sent to the customer acknowledging receipt and verification of the access request. Next, an electronic enabler and, if needed, an automated billing invoice are generated at 128. The automated billing invoice 128 can then be further processed according to the accounting and billing procedures of the centralized facility. After generation 128, the electronic enabler is then downloaded 130 from the centralized facility to the specific device 112, 116. The electronic enabler preferably is an alphanumeric software key that is programmed to operate a specific software option on a particular device to avoid the possibility of unauthorized usage. A date/time stamp is embedded within the key and causes the software to expire according to the terms of the access grant. In an alternative embodiment, after generation of the electronic enabler 128, an agreement or license granting access to the device can be generated and sent to the customer that automatically terminates upon expiration of the access grant.

After download 130, the electronic enabler is stored in memory of the device 132 and upon activation the software program is enabled and the customer is granted access to the option requested. Preferably, the system automatically verifies the accessibility of the option and transmits an electronic verification message 134 from the centralized facility to the customer and/or the remote customer station.

Upon access to the resident option, the system monitors the customer's usage of the option 136 according to a set of predetermined access grant terms. Further, an indicator is provided to monitor each access grant term by monitoring when a remaining access time exceeds a certain threshold. At such time, the system transmits and/or displays a warning of access grant expiration 138. The system continues monitoring customer usage 140, 142 until the access grant is about to expire 140, 144. If the customer and the grantor agree, and the customer's status is not unqualified, then the customer can renew access to the resident option under the same or similar terms as the original or previous access grant 146, 148. If renewal is chosen, then the system generates a new electronic enabler at 128 without requiring the customer to re-enter the identification data. Moreover, the system notifies appropriate accounting departments for billing of the new access grant. If the customer chooses to let the access grant expire 146, 150, then access to the option is terminated at 152, which ends the algorithm 154.

Accordingly, the present invention includes a method to remotely permit use of software options resident in memory of a device that includes receiving an access request from a user of a remotely located device for permission to access a software option that is resident in memory of the device. Preferably, the access request is received by sending the request via a communication interface to a centralized facility. Upon determination that a set of criteria has been met for a particular request, an electronic enabler, or software key, is then generated and configured to permit limited access to the option in response to an access grant. Preferably, the electronic enabler permits access to software that is already installed in the device. Moreover, to provide increased security, the electronic enabler may be transmitted via a private communication interface from a centralized facility to the device. If desirable, however, a public communication interface can also be utilized. Ultimately, the method automatically enables customer access to the option in the device in response to reception of the electronic enabler.

Access to the option is realized according to a predetermined access grant or period which can be defined in terms of the number of uses of the option, a continuous use of the option for a limited time period, or a discontinuous use for a predetermined time duration. The method can include validating a customer identification and system identification at a centralized facility and upon validation, transmitting a message from the centralized facility to a qualified customer verifying receipt of the request. The method can additionally deny access to an option if a customer has failed to maintain a favorable or qualified customer status and can include granting a license for use of the software and/or the option, expressly or impliedly.

The invention includes an access granting system that includes a device having at least one disabled option resident on a computer programmed to control the device and a centralized facility located remotely from the device and having at least one access computer. The access computer is programmed to receive from a qualified or favorable customer, a request to access and use a disabled option in the device and grant access and use, on a pay-per-use basis, of the disabled option for a predetermined time period, which can be defined for each customer as needed.

The invention also includes a computer data signal embodied in a carrier wave and representing a sequence of instructions which, when executed by at least one processor, causes the processor to receive at a centralized facility an access request from a user to access an option resident in a remote device. The sequence of instructions also cause the processor to determine whether the end user is qualified, and if so, grant limited access to the option resident in the remote device. The processor further generates a software key designed to allow limited access to the option and send the software key to the device, wherein the software key enables limited user access to the option. Preferably, the electronic enabler is created with embedded terms that control the expiration period of the option. When the expiration period is reached, the option is automatically disabled. It is also contemplated that the present invention will be capable of generating multiple electronic enablers to different options on a particular device.

The present invention has been described in terms of the preferred embodiment, and it is recognized that equivalents, alternatives, and modifications, aside from those expressly stated, are possible and within the scope of the appending claims.

What is claimed is:

1. A method to remotely permit use of resident software options comprising the steps of:
    (A) receiving an access request from a remotely located client-device seeking access to an option resident in memory of the remotely located client-device;
    (B) determining whether to grant limited access to the option of the remotely located client-device in response to the access request when a set of criteria has been met;
    (C) generating an electronic enabler configured to permit access to the option in response to an access grant;
    (D) transmitting the electronic enabler to the remotely located client-device;
    (E) automatically enabling customer access to the option in the remotely located client-device in response to reception of the electronic enabler; and
    (F) granting a license when access is approved and wherein access to the option automatically terminates upon license expiration.

2. The method of claim 1 further comprising the step of monitoring use of the option and providing a warning of an expiration of the access grant.

3. The method of claim 2 further comprising monitoring one of a number of uses and a time period, wherein an expiration of either is used to automatically terminate access to the option after providing the warning.

4. The method of claim 2 further comprising the step of automatically transmitting a renewal access request, and allowing extension of the access grant without interruption of access to the option, wherein terms of the renewal access request are consistent with terms of the previous access grant.

5. The method of claim 1 further comprising the step of granting limited access on a pay-per-use period.

6. The method of claim 5 wherein the pay-per-use period comprises one of a fixed time period, particular days in a week, and particular times of a day.

7. The method of claim 1 wherein the set of criteria comprises:
   validating customer identification;
   validating system identification;
   determining an option; and
   determining a pay-per-use method.

8. The method of claim 1 further including the step of receiving the access request at a centralized facility from a remote user via a public communication interface.

9. The method of claim 1 wherein steps (A)–(E) are entirely automated at a centralized facility.

10. The method of claim 1 wherein the step of receiving an access request further includes the steps of:
    receiving a customer identifier from a customer; and
    validating the customer via the customer identifier.

11. The method of claim 10 wherein the step of validating the customer via the customer identifier includes the steps of:
    retrieving a customer status of the customer;
    denying the access request if the customer status is unqualified; and
    granting the access request if the customer status is qualified.

12. The method of claim 11 wherein a customer status of unqualified includes one of a delinquent account, an exhausted line of credit, a poor credit history, and a refusal to complete educational requirements and a customer status of qualified includes a non-delinquent account.

13. The method of claim 1 wherein the remotely located client-device is a medical imaging scanner.

14. An access granting system comprising:
    a device having at least one disabled option resident on a computer programmed to control the device;
    a centralized facility located remotely from the device and having at least one access computer programmed to:
        receive from a qualified customer a request to access and use the disabled option; and
        grant access and use, on a pay-per-use basis, of the disabled option for a predetermined time period.

15. The system of claim 14 wherein the at least one access computer programmed to:
    determine a customer qualification status;
    deny the request if the customer status is unqualified; and
    grant the request if the customer status is qualified.

16. The system of claim 15 wherein an unqualified customer status includes an unfavorable billing status and a qualified customer status includes a favorable billing status.

17. The system of claim 14 wherein the at least one access computer is further programmed to generate an electronic enabler and transmit the electronic enabler to the device.

18. The system of claim 14 wherein the at least one access computer is further programmed to:
    transmit an enabling software key to the device from the centralized facility;
    verify option access in the device; and
    send a verification message to the customer confirming access.

19. The system of claim 14 wherein at least one access computer is further programmed to send an electronic verification of receipt of the access request.

20. The system of claim 14 wherein the device includes at least one medical imaging scanner.

21. The system of claim 14 wherein the customer is denied access to the disabled option after expiration of a pay-per-use period.

22. The system of claim 21 wherein a computer of the device monitors access to the resident option and provides a warning of an expiration of customer access to the resident option prior to the expiration of an access grant.

23. A computer data signal embodied in a carrier wave and representing a sequence of instructions which, when executed by at least one processor, causes the at least one processor to:
    receive at a centralized facility an access request from a user to request access to an option resident in a remote client-device;
    receive a user identifier;
    validate the user identifier;
    generate a billing status of the user;
    deny the access request if the billing status is unfavorable;
    grant the licensing request with if the billing status is favorable;
    grant limited access to the option resident in the remote client-device;
    generate a software key designed to allow limited access to the option;
    send the software key to the client-device; and
    enable limited access by a user to the option.

24. The computer data signal of claim 23 wherein the sequence of instructions embodied in the signal include further instructions to transmit a renewal access request consistent with terms of a previous grant of limited access.

25. The computer data signal of claim 23 wherein the sequence of instructions embodied in the signal includes further instructions to deny access to the option upon expiration of the limited access grant.

26. The computer data signal of claim 23 wherein the sequence of instructions embodied in the signal includes further instructions to send the software key via one of a private communication interface and a public communication interface.

27. The computer data signal of claim 23 wherein the client-device is a medical imaging scanner.

28. The computer data signal of claim 23 wherein the software key is embedded with data that controls an expiration period of the option.

29. The computer data signal of claim 23 wherein the software key provides access to one or more options in the client-device.

30. A method to remotely permit use of resident software options comprising the steps of:

(A) receiving an access request from a remotely located client-device seeking access to an option resident in memory of the remotely located client-device;

(B) determining whether to grant limited access to the option of the remotely located client-device in response to the access request when a set of criteria has been met, wherein the set of criteria includes:
validating customer identification;
validating system identification;
determining an option; and
determining a pay-per-use method;

(C) generating an electronic enabler configured to permit access to the option in response to an access grant;

(D) transmitting the electronic enabler to the remotely located client-device; and (E) automatically enabling customer access to the option in the remotely located client-device in response to reception of the electronic enabler.

* * * * *